United States Patent [19]
Langen et al.

[11] Patent Number: 5,732,880
[45] Date of Patent: Mar. 31, 1998

[54] HEATER FOR A VEHICLE POWERED BY AN INTERNAL-COMBUSTION ENGINE

[75] Inventors: Herbert Langen, Altbach; Peter Reiser, Esslingen; Dirk Brenner, Stuttgart; Wolfgang Pfister; Walter Blaschke, both of Esslingen; Erwin Burner, Adelberg, all of Germany

[73] Assignee: J. Eberspächer GmbH & Co., Esslingen, Germany

[21] Appl. No.: 793,231

[22] PCT Filed: Aug. 1, 1995

[86] PCT No.: PCT/DE95/01019

§ 371 Date: Feb. 6, 1997

§ 102(e) Date: Feb. 6, 1997

[87] PCT Pub. No.: WO96/06305

PCT Pub. Date: Feb. 29, 1996

[30] Foreign Application Priority Data

Aug. 18, 1994 [DE] Germany .................. 44 29 237.6
Dec. 30, 1994 [DE] Germany .................. 44 47 281.1
Jul. 17, 1995 [DE] Germany .................. 195 26 003.1

[51] Int. Cl.$^6$ ............................................. B60H 1/02
[52] U.S. Cl. ............................. 237/12.3 B; 237/12.3 A
[58] Field of Search ................ 237/12.3 C, 12.3 A

[56] References Cited

U.S. PATENT DOCUMENTS

| | | | |
|---|---|---|---|
| 3,840,323 | 10/1974 | Eckerle et al. | .............................. 431/90 |
| 4,553,697 | 11/1985 | Nothen et al. | .................... 237/12.3 B |
| 4,940,041 | 7/1990 | Riedmaier et al. | .................. 126/110 R |

*Primary Examiner*—Henry A. Bennett
*Assistant Examiner*—Derek Boles
*Attorney, Agent, or Firm*—McGlew and Tuttle

[57] ABSTRACT

The vehicle heater described has a burner supplied from a tank through a fuel line to which a pressure-controlled fuel pump (2) and a solenoid valve (24) are connected. The solenoid valve offers a relatively high resistance to the flow of fuel. The pressure in the pump delivery line thus drops relatively slowly. If vapor/gas forms in the fuel line (L2, L3, L4) due to overheating, it must be driven out of the line as rapidly as possible when the heater is switched on. The solenoid valve (24) offers only a low resistance to air/vapor/gas, resulting in a rapid drop in pressure at the pump delivery outlet and hence an increase in pump frequency (i.e. pump performance). The gas is therefore driven very rapidly out of the line between the pump and the burner, thus avoiding any interruptions in operations due to gas/vapor which has collected in the fuel line.

20 Claims, 3 Drawing Sheets

HEATER FOR A VEHICLE POWERED BY AN INTERNAL-COMBUSTION ENGINE

FIELD OF THE INVENTION

The present invention pertains to a heater, especially for a vehicle driven by an internal combustion engine, with a burner, to which fuel is fed from a tank via a fuel line.

BACKGROUND OF THE INVENTION

Various variants of such heaters have been known. In most cases, they are used as auxiliary heaters for passenger cars, trucks, buses, and the like, and therefore are frequently also called, not quite correctly, "parking heaters." Other important fields of application are motor homes, trailers, boats and ships, and especially also construction equipment.

In vehicles with internal combustion engines, the heater is advantageously arranged in the area of the engine compartment, partly because a fuel line is available there for tapping, and partly because a relatively readily accessible space is available there for accommodating the individual parts of the heater.

The heater contains a combustion chamber, which is arranged in a space downstream of a burner and is surrounded by a space through which a heat carrier flows. Combustion air is fed to the burner via a combustion air blower, on the one hand, and fuel is fed to it from a tank by a fuel pump, on the other hand.

While the combustion chamber, the burner, the combustion air blower, and additional parts of the heater are arranged in a common housing, the fuel pump is usually located at a point removed from this housing, and it is connected to the tank via a fuel line or to a tapping point of the fuel line for the internal combustion engine, on the one hand, and to the burner, on the other hand.

Depending on the burner output set, the fuel pump delivers a varying amount of fuel per unit of time to the burner. Automatically controlled pressure pumps responding to pressure in the drain line (pressure-controlled pumps) are used as fuel pumps in conjunction with a pressure regulator. The general design of such pressure-controlled pumps will be explained in greater detail below.

A residual amount of fuel remains in the fuel line between the pressure-controlled pump and the burner after the heater has been switched off, especially when the vehicle is stopped. If the environment of the fuel line is warm or even hot, as it usually is in the engine compartment of a motor vehicle, the temperature of the fuel in the fuel line section increases, and the residual fuel evaporates in this section of the fuel line. Since the fuel pump is not running, and the return of expanding fuel through the fuel pump is ruled out by, e.g., a nonreturn valve, fuel is pressed into the burner because of the evaporating fuel and the excess pressure building up in the process in the section of the fuel line. This amount of fuel is also burned later at the time of the ignition of the burner. Measures must be taken to prevent this amount pressed into the burner from becoming large enough to cause a hazardous explosion at the time of a subsequent ignition process.

The evaporation of fuel in the line section between the fuel pump and the burner after the heater has been stopped leads to problems when the heater is subsequently switched on, because the fuel pump does not deliver fuel after it has been switched on, but first only air or gas/vapor from the section of the fuel line between the fuel pump and the burner. If the burner contains, e.g., a nozzle for atomizing the fuel, only a mixture of air, gas and fuel vapor will be discharged from the nozzle, and this mixture can never form a combustible mixture with the combustion air being fed in at the same time. If sufficient fuel supply with subsequent flame formation fails to take place within a certain period of time, the device is switched off by the safety switch, which is in connection with a flame failure controller.

Considerable disturbances may consequently occur in the operation of the heater due to the above-described processes, especially when the part of the fuel line that is located between the fuel pump and the burner is arranged in an area of the engine compartment of the vehicle where considerably high temperatures prevail. Such problems, which can be attributed to increased temperatures of part of the fuel line, may have other causes as well.

One could think of the possibility of setting the delivery capacity of the fuel pump to the maximum for a certain period of time immediately after the heater has been switched on in order to expel the largest possible amount of air very rapidly from the fuel line section. However, this is not directly possible in the case of pressure-controlled pumps, i.e., automatically controlled pumps.

SUMMARY AND OBJECTS OF THE INVENTION

The heaters according to the present invention are primarily heaters operated with gasoline, but it should be noted that the present invention can also be applied to diesel-operated vehicle heaters as well as to burners for regenerating particle filters for diesel engines.

The developments in automotive engineering have led to modern passenger cars being increasingly equipped with fuel injection engines instead of carburetor type gasoline engines. A fuel pump, which delivers fuel from the tank and feeds it into to the injection system of the internal combustion engine via a flow pipe, is present in vehicles with fuel injection engines, usually in the vicinity of the tank. Depending on the operating state of the internal combustion engine, part of this amount of fuel, fed in at a relatively high throughput, is consumed by the injection system, and the rest is returned into the tank via a return line.

One special feature of the present invention is that a solenoid valve is inserted into the fuel line.

One aspect of the present invention is based on the discovery that in a heater with a separate, pressure-controlled fuel pump, a solenoid valve, which is inserted into the fuel line and acts as a throttling point, offers a considerable resistance to the fuel, which increases super-proportionally as the flow rate increases, whereas such a throttling points offers only very little resistance to air or gas or vapor. The pressure in the outlet line of the pump gradually decreases in normal operation, and a switch actuated in a pressure-dependent manner is closed when a certain value is reached, so that an electromagnet of the pump is energized and a pump stroke is caused to take place. If the pressure in the outlet line of the pump decreases relatively rapidly, the pump strokes take place at a relatively high frequency, and the delivery capacity is correspondingly high. The delivery capacity is correspondingly low in the case of a relatively slow drop in pressure in the outlet line of the pump.

If gas, vapor and/or air is present in the fuel line downstream of the fuel pump, the pressure of this gas decreases relatively rapidly despite the throttling point, so that the automatically controlled pressure pump rapidly and automatically increases its delivery capacity and it immediately expels a large amount of gas out of the fuel line as a result. If fuel is then finally delivered again, and this fuel is present at the throttling point, the pump returns to the normal operation. This effect can also be achieved—in not quite so favorable a design—with another embodiment of the throttling point (line throttles, which may possibly be of the usual design).

In an especially preferred embodiment, the throttling point is designed as a solenoid valve. The solenoid valve is energized at a defined frequency corresponding to the required burner output. If the duty factor of the solenoid valve (ratio of the open time to the closed time of the solenoid valve) is assumed to be constant, the frequency of the signal controlling the solenoid valve corresponds to the flow rate. The pressure in the line section between the solenoid valve and the pressure pump changes depending on the flow rate, so that the pressure pump operates at a stroke frequency that is proportional to the frequency of actuation of the solenoid valve.

Depending on the delivery capacity of the pressure-controlled pump and the throttling action on the solenoid valve, it may be advantageous in the case of very high pump flow rates, which are determined by the required burner capacity, to—temporarily—continuously open the solenoid valve when the pressure pump operates at a pumping frequency exceeding a certain threshold value.

As was indicated above, it shall be ensured that the amount of fuel pressed into the combustion chamber by the evaporation process after the heater has been switched off will not be too large. Provisions are therefore made according to the present invention for the fuel pump and the throttling point to be arranged as close to the burner as possible.

In another aspect of the present invention, the fuel line for the burner is coupled with the flow line, via which fuel is sent to the internal combustion engine by means of the fuel pump. This measure is also possible without the solenoid valve in the fuel line.

A number of advantages are achieved by this measure:

The relatively expensive fuel feed pump in the vehicle heater may be eliminated. Existing components of the fuel delivery means of the engine are partially used, instead (these will be explained in greater detail below);

a pressure on the order of magnitude of up to 0.5 MPa prevails in the flow line of a motor vehicle equipped with a fuel injection type gasoline engine. This admission pressure, possibly somewhat reduced via a pressure regulator present in the fuel line, is available at the burner of the heater. Contrary to the usual feed pumps, unpleasant vapor bubbles are not formed in the fuel line even at temperatures above 20° C. due to this admission pressure;

the entire vehicle heater can be designed as a more compact unit due to the elimination of the metering pump;

the vehicle heater can be assembled more rapidly, because considerable assembly time is saved due to the elimination of the fuel feed pump;

the connection of the fuel line leading to the burner to a flow line is substantially simpler and consequently more inexpensive than the installation of a separate fuel line between the tank and the vehicle heater.

As was indicated above, a device is provided in the burner for the metered feed of fuel to the burner as a replacement for the fuel feed pump. According to the present invention, this is the solenoid valve, which is arranged in the fuel line and is energized by the control device of the vehicle heater with a control signal. This control signal is preferably a pulse-width modulation signal (PWM signal), which opens and closes the solenoid valve with a pulse train of a defined frequency, and the pulse train has a defined duty factor, which determines the average throughput through the solenoid valve.

The PWM signal is generated in the control device, without an appreciable additional expense being necessary. The solenoid valve itself is a relatively small component, which requires considerably less space than the fuel feed pump that was previously necessary. In addition, the solenoid valve is relatively inexpensive.

A considerably larger amount of fuel is fed to a fuel injection type gasoline engine than is consumed by the engine even in the highest output range. The amount of fuel needed by the heater is small compared with this, so that the "tapping" of the flow line does not interfere with the operation of the engine in any way. When the internal combustion engine is running, a sufficient amount of fuel is available for the operation of the vehicle heater, even at the highest output stage. If the vehicle heater is also to be operated with the internal combustion engine not running (when the fuel pump of the vehicle is not running, either), the fuel pump of the engine must be put into operation because of the lack of a fuel feed pump in the vehicle heater. The present invention makes provisions for this purpose for the fuel pump to be operated by the vehicle heater when the engine is not running, especially by the control device of the vehicle heater sending a PWM signal for operating the fuel pump. This PWM signal is then coordinated with the operation of the vehicle heater such that the fuel pump of the vehicle delivers only the amount of fuel that is maximally needed by the heater. It is achieved as a result that the fuel pump does not operate at full load, which means the saving of a considerable amount of electricity.

As was mentioned in the introduction, the present invention is intended especially for motor vehicles which have a fuel injection type gasoline engine. However, the present invention can also be used in diesel engines. If corresponding pressure control measures are taken, it can be achieved that the admission pressure at the vehicle heater is reduced to a suitably lower value.

The term "vehicle heater" pertains to the heaters explained in the introduction, which are used mainly to heat the passenger compartment of a vehicle, but which are also used to feed thermal energy into the coolant circuit of diesel engines, especially turbodiesel engines when these engines are operated at such a high efficiency that the coolant temperature does not rise to the optimal value or it does so very slowly at best.

However, a special possible application of the present invention is the burner of a device for regenerating particle filters of diesel engines. Such particle filters are cleaned or regenerated at certain intervals by means of a burner, and this burner is also operated with gasoline or diesel fuel as the fuel. Instead of a fuel feed pump feeding fuel to the burner, the fuel can also be fed in by connecting the burner to the flow line of the vehicle's injection system, and the fuel can be fed with an above-described timing valve and a corresponding energizing means.

An exemplary embodiment of the present invention will be explained in greater detail below on the basis of the drawing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
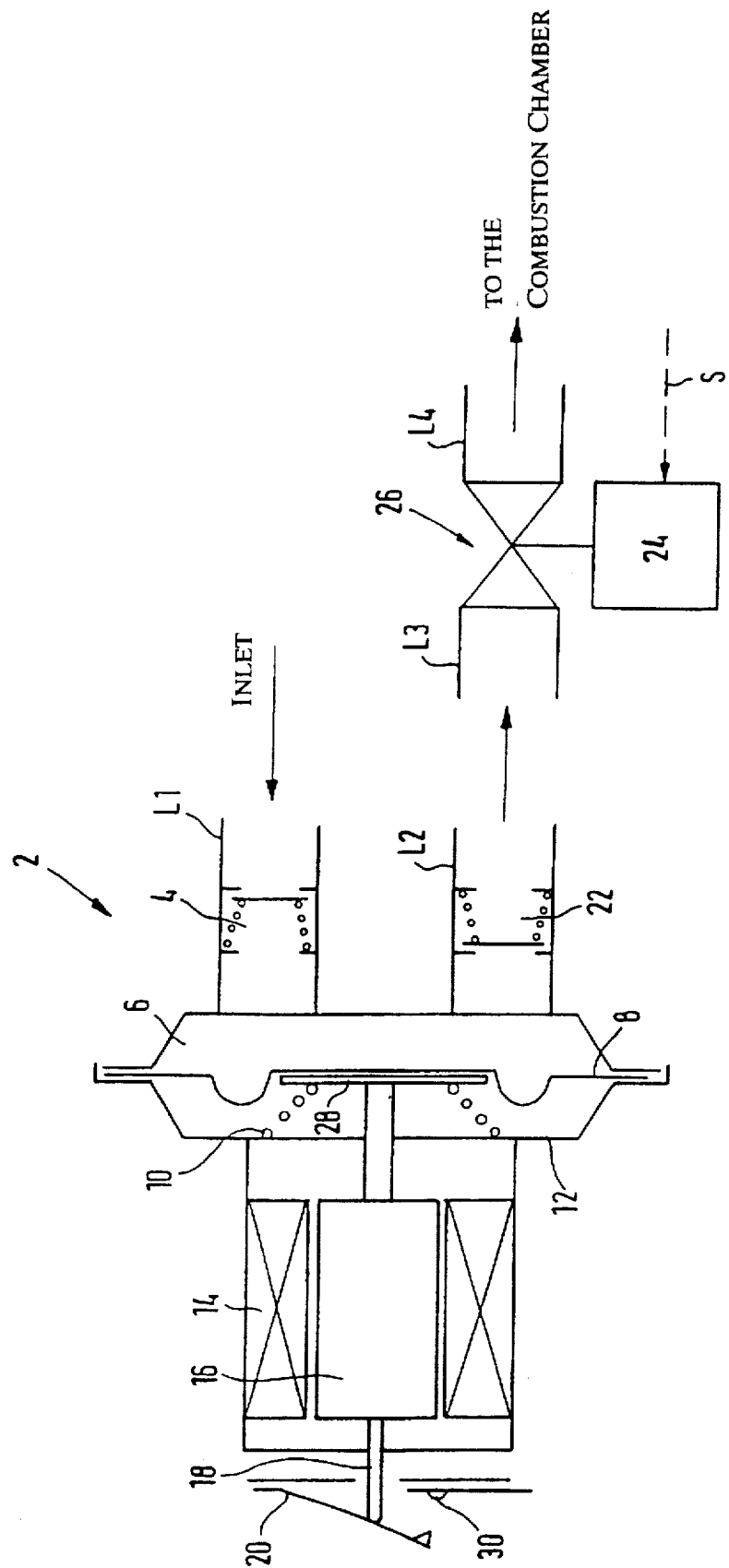
FIG. 1 is a schematic diagram of a pressure-controlled fuel pump in connection with a downstream solenoid valve according to a first aspect of the present invention.

According to FIG. 1, a pressure-controlled fuel pump 2 is inserted in the fuel line, which is represented here in sections by L1, L2, L3 and L4, between a tank (not shown) and a burner (likewise not shown).

Via an inlet, which is formed by a line section L1 and has a first nonreturn valve 4, fuel enters a pump chamber 6, where a certain pressure prevails. The pump chamber 6 is formed by part of a pump housing 12, on the one hand, and, on the other hand, by a diaphragm 8, whose middle area is in contact with a plate 28, which is in turn coupled with an armature 16 of an electromagnet 14. The plate 28 is supported by a spring 10 at the rear part of the pump housing 12.

The armature 16 carries a pin 18, which acts on a contact spring 20 of a switch, which is located in the circuit of the electromagnet 14.

Fuel which is under pressure can flow from the pump chamber 6 into the line section L2 via a second nonreturn valve 22. The pressure in the pump chamber 6 decreases as fuel flows out of the pump chamber 6, so that the diaphragm 8 moves to the right in FIG. 1 under the pretensioning action of the spring 10. The pin 18 of the armature 16, which pin is coupled with the plate 28, also moves with this movement until the outer tip of the pin 18 has finally moved to the right to the extent that the contact spring 20 comes into contact with the stationary contact 30 and closes the circuit of the electromagnet 14.

The energized electromagnet 14 moves the armature 16 to the left in FIG. 1 against the pretensioning force of the spring 16, so that more fuel can flow into the pump chamber 6 via the line section L1 and the first nonreturn valve 4. The above-described process is subsequently repeated.

From the line section L2, which forms the outlet of the pressure-controlled pump 2, the fuel finally enters the line section L3 before a throttling point 26, which is formed by a solenoid valve 24 here.

A control signal of a defined frequency is sent to the solenoid valve via a control line S, so that the solenoid valve 24 opens and closes the connection between the two fuel line sections L3 and L4 or increases and decreases the cross section of this connection. The solenoid valve 24 is energized with a signal of low or high frequency depending on the burner output required (heat demand).

Figure 2:
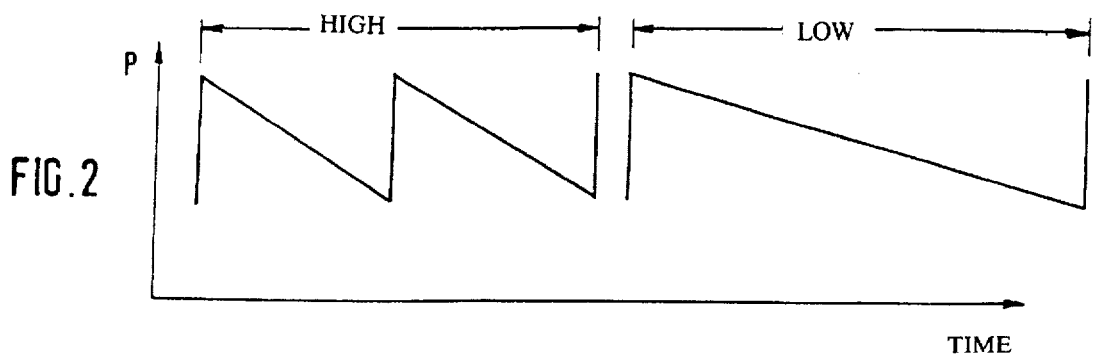
FIG. 2 is a pressure curve over time at the outlet of the pump according to FIG. 1.
Figure 3:
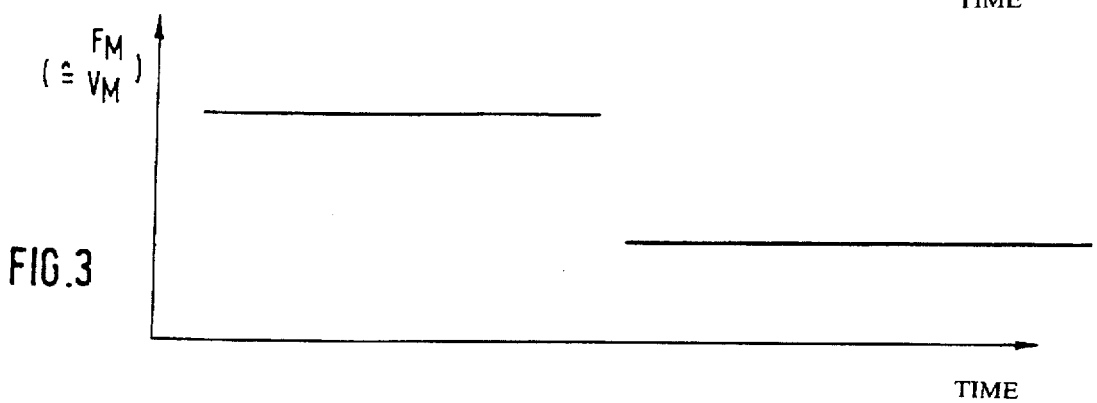
FIG. 3 is the changes in the frequency of the solenoid valve according to FIG. 1 over time.

This is shown schematically in FIGS. 2 and 3. According to FIG. 3, the frequency of actuation $F_M$ for the solenoid valve 24 is at first relatively high, which corresponds to a relatively high flow rate $V_M$.

Corresponding to FIG. 2, the pressure curve for the pump chamber is shown in the left-hand half. Due to the relatively high flow rate through the solenoid valve, the pump 2 performs relatively many delivery strokes. The variations in pressure in the pump are relatively small, so that they hardly affect the throughput at the site of the solenoid valve.

When the frequency of actuation $f_M$ of the solenoid valve is then reduced, as is shown in the right-hand part of FIG. 3, the amount being delivered is correspondingly small, and the pumping frequency of the pump is correspondingly low as well. Only one process of the above-described type is shown in the right-hand part of FIG. 2 for a relatively long period of time.

If it is now assumed with reference to FIG. 1 that a large amount of gas and vapor has collected in the line sections L2, L3, L4 due to the close proximity of the fuel line formed by the sections L2, L3 and L4 to the engine of the vehicle, the air flowing through is hindered only relatively slightly at the throttling point 26 when the heater is switched on. In other words, the flow resistance of the throttling point with respect to air is extremely low compared with the flow resistance with respect to fuel.

Because of the low flow resistance to gas/air/vapor, there is a relatively rapid drop in pressure in the area of the line section L2, i.e., at the outlet of the pressure-controlled pump 2, so that the above-described pumping process, characterized by the movement of the armature 16 to the right and the subsequent, electromagnetically generated springing back of the armature 16 to the left, is repeated very rapidly, doing so until the pressure drop in the outlet line L2 of the pump 2 becomes slower again. This happens when practically the total amount of air has been expelled from the line sections L2, L3 and fuel is again present at the throttling point 26. The throttling point 26 with the solenoid valve 24 is preferably arranged in the vicinity of the burner or of the combustion chamber, and the pump 2 is also arranged as close to the burner as possible, to ensure that the smallest possible amount of fuel can be displaced by the evaporation process into the burner from the line section between the pump and the burner.

Figure 4:
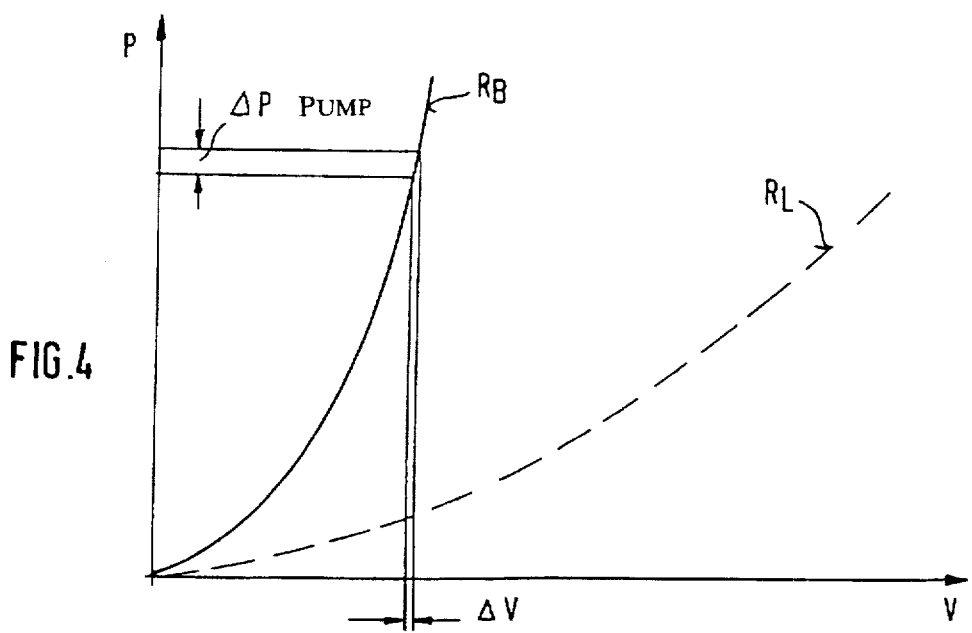
FIG. 4 is the relationship between the pressure at the outlet of the pump and the flow rate.

FIG. 4 shows the pressure conditions at the pump as a function of the flow rate. The curve drawn in solid line shows the resistance to the fuel, which is formed by the solenoid valve 24, while the broken line shows the resistance $R_L$ to air. As can be seen, the resistance $R_B$ to the fuel increases greatly and superproportionally with increasing flow rate. Since the pressure difference $\Delta p$ at the pump is relatively low during a delivery stroke of the pump, there are only slight variations in flow rate, and these variations are negligible for the considerations which are of interest here.

The second aspect of the present invention will now be explained on the basis of FIG. 5.

Figure 5:
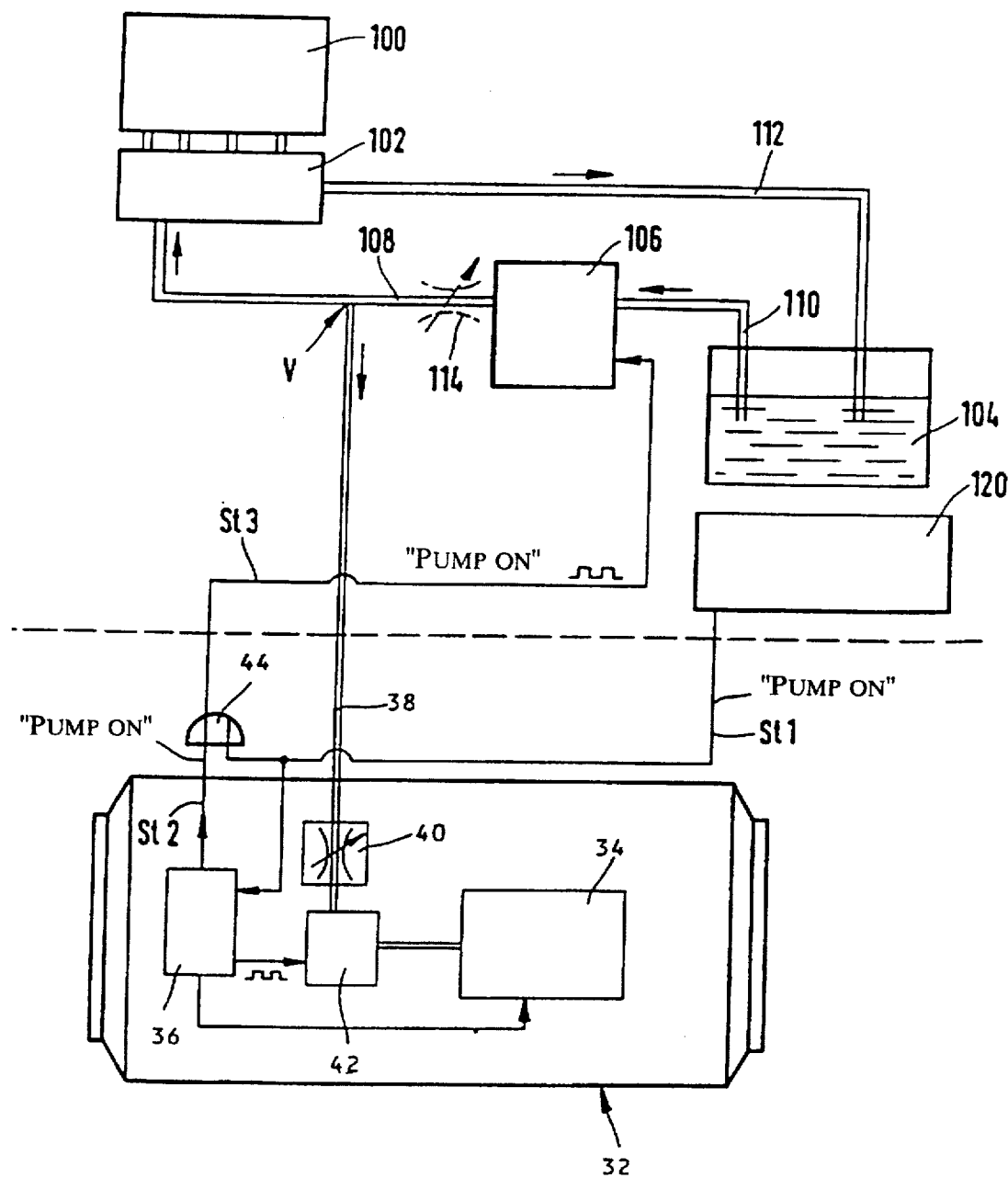
FIG. 5 is a partly schematic view of individual elements of a vehicle drive and of a heater for a motor vehicle, according to a second aspect of the present invention.

A vehicle heater 32 designed in the usual manner per se is shown schematically in the lower part of FIG. 5. A housing of the vehicle heater 32 accommodates a burner 34, which is represented, in general, as a functional block. Fuel is supplied to the burner 34 for the operation, and combustion air is fed to the said burner via a combustion air blower, not shown. The flame space of the burner is surrounded by a heat exchanger, which transmits the heat generated by the burner to a heat carrier (water or air). The thermal energy contained in the heat carrier is then fed—via a line system, not shown here—to a heat exchanger, which is located, e.g., in the ventilating system of a passenger compartment of a vehicle.

The vehicle heater has a heater control device 36, which is also indicated schematically in the figure. The control device 36 receives status signals from various sensors, not shown here, and controls various functions of the vehicle heater 32.

The fuel is fed to the burner 34 via a fuel line 38, in which a pressure regulator 40 and an electric solenoid valve 42 are inserted.

Gasoline is present as the fuel under a certain admission pressure of, e.g., 3 bar in the fuel line 38. The electric solenoid valve 42 is intermittently opened by a PWM signal, which has a defined frequency and a defined duty factor. The PWM signal is generated by the control device 36 and depends, among other things, on the desired burner output set.

Contrary to prior-art vehicle heaters with a fuel feed pump installed in the housing of the device, the fuel is fed in here by the fuel line 38 being coupled with a flow line 108 at a connection point V.

The elements represented functionally in the top half of FIG. 5 belong to the vehicle and are present regardless of whether or not the vehicle is equipped with a vehicle heater of the above-described type.

The drive motor of the vehicle is a fuel injection type gasoline engine 100, to which the needed amount of fuel can be fed separately for each cylinder by an injection system 102. The injection system 102 receives the gasoline from a fuel tank 104 by a fuel pump 106 drawing gasoline from the fuel tank 104 via a suction line 110 and feeding the gasoline to the injection system 102 via the flow line 108 under a certain pressure (typically 0.5 MPa).

Only part of the gasoline fed to the injection system 102 via the flow line 108 is consumed even when the fuel injection type gasoline engine 100 is operated at the highest output. The rest flows back into the fuel tank 104 via a return line 112.

A pressure which is sufficient not only for the operation of the internal combustion engine but also for that of the burner 34 in the vehicle heater is always present in the flow line 108 and consequently also in the fuel line 38 leading to the vehicle heater 32 during the operation of the engine. The vehicle electrical system 120, indicated as a block in the right-hand part of the figure, sends a driver signal "Pump ON" on the control line St 1. It would be possible to connect this control line St 1 directly to the fuel pump 106. The control line St 1 is connected here to an OR gate 44, whose output is connected to the fuel pump 106 via a control line St 3. A second input of the OR gate 44 receives a "Pump ON" signal via a control line St 2 from the control device 36. The control device 36 responds to the status of the signal on the control line St 1 from the vehicle electrical system 120, which signal characterizes the stopping of the engine and of the fuel pump 106, by sending a signal to the control line St 2, and this signal is sent to the fuel pump 106 via the OR gate 44 and the control line St 3.

The "ON" signal sent by the control device 36 is a PWM signal of such a frequency and of such a duty factor that the fuel pump 106 delivers just enough gasoline into the flow line 108 as is consumed by the heater 32 at the highest output stage.

It is conceivable that the fuel pump 106 can also be operated via the vehicle's electric system 120 with the engine shut off even if the internal combustion engine is stopped, in which case the fuel pump 106 would waste energy, because only a very small fraction of the amount being delivered would be drawn off via the fuel line 38, i.e., most of the amount being delivered would be returned into the tank via the return line 112.

Instead of controlling the electric solenoid valve 42 by a PWM signal, another control may also be provided for metering the amount of fuel for the burner. This also applies correspondingly to the energizing of the fuel pump 106 with the internal combustion engine stopped. Instead of a PWM signal on the line St 3, the output of the fuel pump can be reduced by means of a dropping resistor.

While a specific embodiment of the invention has been shown and described in detail to illustrate the application of the principles of the invention, it will be understood that the invention may be embodied otherwise without departing from such principles.

We claim:

1. A heater, comprising:
   a burner;
   a fuel tank;
   a fuel line, said burner being fed with fuel from said fuel tank via said fuel line; and
   a solenoid valve inserted in said fuel line, said solenoid valve forming a throttle point, said throttle point forming a higher flow resistance to liquid than to gas.

2. A heater in accordance with claim 1, further comprising a pressure controlled fuel pump, wherein the fuel is fed in via said, pressure-controlled fuel pump.

3. A heater in accordance with claim 1, wherein said solenoid valve is actuated by a control signal having a defined frequency.

4. A heater in accordance with claim 2, further comprising a controller for controlling said solenoid valve such that said solenoid valve is temporarily opened completely if a delivery frequency of said pressure-controlled fuel pump exceeds a threshold value.

5. A heater in accordance with claim 1, wherein said fuel pump and said solenoid valve are arranged in the vicinity of said burner.

6. A heater in accordance with claim 2 in combination with a motor vehicle internal combustion engine having fuel fed by said fuel pump from said fuel tank via a flow line, said fuel line for said burner being coupled with said flow line.

7. A heater in accordance with claim 6, further comprising a control device, said solenoid valve being energized by said control device with a pulse-width modulation signal.

8. A heater in accordance with claim 6 wherein a said pressure regulator is arranged in said fuel line.

9. A heater in accordance with claim 7, wherein said control device controls operation of said fuel pump when said internal combustion engine is not running.

10. A heater in accordance with claim 7, wherein said control device sends a PWM signal for operating said fuel pump.

11. A heater system for a vehicle driven by a said internal combustion engine, comprising:
   a burner;
   a fuel tank;
   a fuel line connected to said fuel tank and said burner, said burner being fed with fuel from said fuel tank via said fuel line; and
   a solenoid valve inserted in said fuel line, and creating a flow resistance which is higher for liquid than for gas.

12. A heater system in accordance with claim 11, further comprising a pressure controlled fuel pump, wherein the fuel is fed into said burner via said, pressure-controlled fuel pump.

13. A heater system in accordance with claim 11, further comprising a control device for actuating said solenoid valve by a control signal having a defined frequency.

14. A heater system in accordance with claim 12, wherein a control device controls said solenoid valve that said solenoid valve is temporarily opened completely if a delivery frequency of said pressure-controlled fuel pump exceeds a threshold value.

15. A heater system in accordance with claim 12, further comprising a motor vehicle internal combustion engine having fuel fed by said fuel pump from said fuel tank via a flow line, said fuel line for said burner being coupled with said flow line.

16. A heater system in accordance with claim 15, further comprising a control device, said solenoid valve being energized by said control device with a pulse-width modulation signal.

17. A heater system in accordance with claim 11, wherein:

a pump supplies fuel from said fuel tank to said fuel line;

a difference in said flow resistance between liquid and gas in said fuel line causes said pump to increase operation.

18. A heater system in accordance with claim 11, wherein:

a pump supplies fuel from said fuel line;

a difference in said flow resistance between liquid and gas in said fuel line causes said pump to increase a flow rate through said pump.

19. A heater system in accordance with claim 11, wherein:

a pump supplies fuel from said fuel tank to said fuel line;

a controller is provided for shutting off the heater system if, upon initial startup, flame formation fails to occur within a predetermined time;

a difference in said flow resistance between liquid and gas in said fuel line causes said pump to expel gas from said fuel line and deliver fuel to said burner before expiration of said predetermined time.

20. A heater comprising:

a burner;

a fuel tank;

a fuel line, said burner being fed with fuel from said tank via said fuel line;

a solenoid valve inserted in said fuel line;

a pressure controlled fuel pump, wherein fuel is fed into said fuel one via said pressure-controlled fuel pump;

a controller for controlling said solenoid valve such that said solenoid valve is temporarily opened completely if a delivery frequency of said pressure-controlled fuel pump exceeds a threshold value.

* * * * *